United States Patent
Karaoguz et al.

(10) Patent No.: US 7,586,636 B2
(45) Date of Patent: *Sep. 8, 2009

(54) PRINTER RESOURCE SHARING IN A MEDIA EXCHANGE NETWORK

(75) Inventors: Jeyhan Karaoguz, Irvine, CA (US); James D. Bennett, Laguna Beach, CA (US)

(73) Assignee: Broadcom Corp.

( * ) Notice: Subject to any disclaimer, the term of this patent is extended or adjusted under 35 U.S.C. 154(b) by 95 days.

This patent is subject to a terminal disclaimer.

(21) Appl. No.: 11/428,700

(22) Filed: Jul. 5, 2006

(65) Prior Publication Data

US 2006/0238806 A1    Oct. 26, 2006

Related U.S. Application Data

(63) Continuation of application No. 10/675,752, filed on Sep. 30, 2003, now Pat. No. 7,110,135.

(60) Provisional application No. 60/461,717, filed on Apr. 10, 2003, provisional application No. 60/457,179, filed on Mar. 25, 2003, provisional application No. 60/443,894, filed on Jan. 30, 2003, provisional application No. 60/432,472, filed on Dec. 11, 2002.

(51) Int. Cl.
*G06F 15/00* (2006.01)
*G06F 15/16* (2006.01)

(52) U.S. Cl. .................... 358/1.15; 709/203

(58) Field of Classification Search ............. 358/1.15, 358/1.13, 1.16, 1.1; 709/203, 218, 221, 224, 709/227, 231, 238; 235/454, 472.03; 725/100, 725/133, 136, 144; 400/76

See application file for complete search history.

(56) References Cited

U.S. PATENT DOCUMENTS

| | | | |
|---|---|---|---|
| 6,654,135 B2 | 11/2003 | Mitani | |
| 6,795,205 B1 * | 9/2004 | Gacek | 358/1.15 |
| 7,110,135 B2 * | 9/2006 | Karaoguz et al. | 358/1.15 |
| 2002/0135808 A1 | 9/2002 | Parry | |
| 2003/0092395 A1 | 5/2003 | Gassho et al. | |

* cited by examiner

*Primary Examiner*—Saeid Ebrahimi Dehkordy
(74) *Attorney, Agent, or Firm*—McAndrews, Held & Malloy, Ltd.

(57) ABSTRACT

Systems and methods of printer resource sharing in a communication network are provided. In one embodiment, the system may comprise, for example, at least one communication device, a communication network, print server software, and at least one personal printer resource. The communication device may be deployed at a location. The communication network may be communicatively coupled to that communication device. The print server software may receive from the communication device via the communication network a request for printing of information content. The print server software may respond by coordinating the printing of the information content. The at least one personal printer resource may be communicatively coupled to the at least one communication device. The print server software may reside outside of the at least one personal printer resource, and the at least one personal printer resource may be accessed for printing by the communication device via the communication network.

22 Claims, 15 Drawing Sheets

| CHANNEL LINE UP | <<1PM | 2PM | HOUR, DAY ... | 6PM | 7PM>> |
|---|---|---|---|---|---|
| FAMILY VACATIONS | | | | | |
| KID's SPORTS | | | | | |
| ... | | | | | |
| VACATION in ALASKA VIDEO 802 | Normal Estimated Delivery Time: 2 hrs 13 min Cost: 59c (without Queuing) | | | Showing All Day (48 Min), Earliest Order Time: 4:00PM MPEG-2 1.5 Mbps | |
| VACATION in ALASKA VIDEO 803 | Express Estimated Delivery Time: 18 min Cost: $1.2 (with Queuing) | | | Showing All Day (48 Min), Earliest Order Time: 4:00PM MPEG-2 4 Mbps | |
| VACATION in ALASKA VIDEO 804 | Overnight Delivery: Avail. Nxt Morning Cost: 5c (Server Stored) | | | Showing All Day (48 Min), Earliest Order Time: 4:00PM MPEG-2 19 Mbps | |

Fig. 8

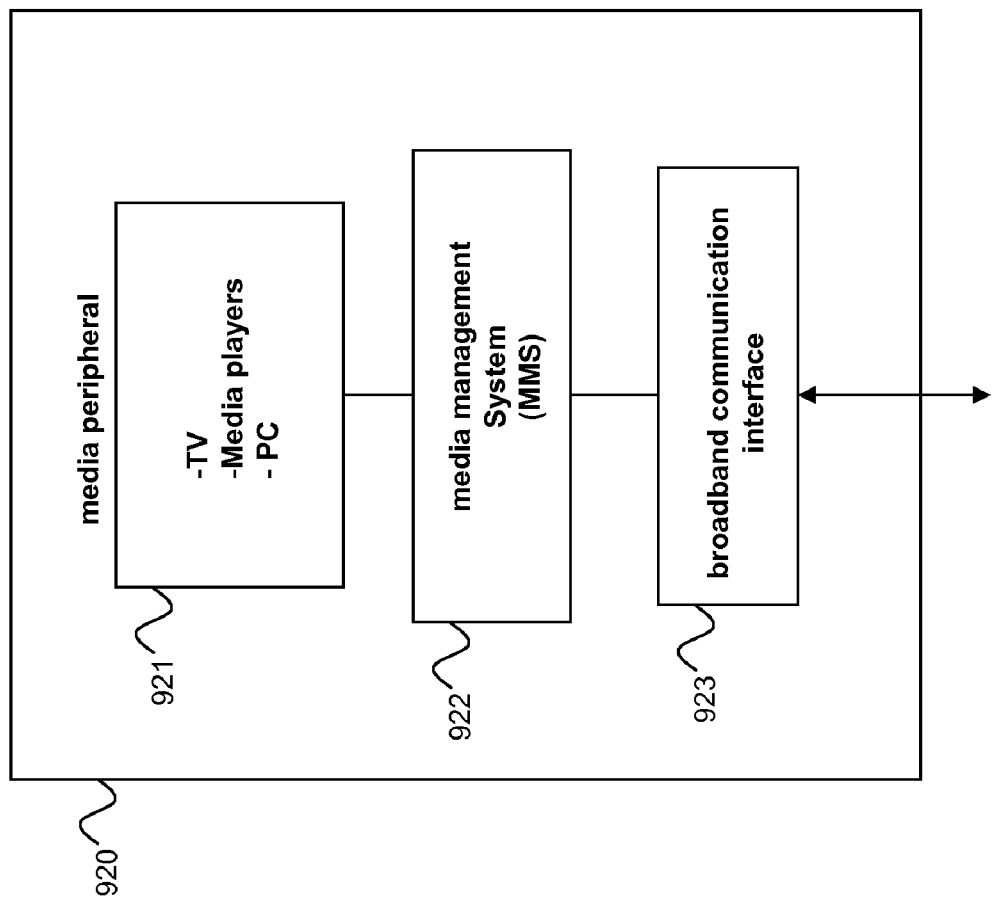

PRINTER RESOURCE SHARING IN A MEDIA EXCHANGE NETWORK

CROSS-REFERENCE TO RELATED APPLICATIONS/INCORPORATION BY REFERENCE

The present application is a continuation of U.S. application Ser. No. 10/675,752, filed Sep. 30, 2003, which makes reference to, claims priority to, and claims the benefit of U.S. Provisional Patent Application Ser. No. 60/469,329, entitled "Printer Resource Sharing in a Media Exchange Network", filed on May 9, 2003, U.S. Provisional Patent Application Ser. No. 60/457,179, entitled "Server Architecture Supporting a Personal Media Exchange Network", filed on Mar. 25, 2003, U.S. Provisional Patent Application Ser. No. 60/461,717, "Secure Media Peripheral Association with Authentication in a Media Exchange Network", filed on Apr. 10, 2003, U.S. Provisional Application Ser. No. 60/432,472, entitled "Personal Inter-Home Media Exchange Network", filed Dec. 11, 2002, and U.S. Provisional Application Ser. No. 60/443,894, entitled "Personal Access And Control Of Media Peripherals On A Media Exchange Network", filed Jan. 30, 2003, the complete subject matter of which are hereby incorporated herein by reference, in their entirety.

In addition, the applicants hereby incorporate the complete subject matter herein by reference, in their entirety, of U.S. patent application Ser. No. 10/657,390, entitled "Personal Inter-Home Media Exchange Network", filed on Sep. 8, 2003, and U.S. patent application Ser. No. 10/660,267, entitled "Personal Access And Control Of Media Peripherals On A Media Exchange Network", filed on Sep. 11, 2003, the complete subject matter of which are hereby incorporated herein by reference, in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

The manner in which printing resources are utilized is somewhat limiting. For example, a first user may have a personal printer, which is directly connected to a first personal computer (PC). A network printer is connected to an Ethernet which, in turn, is connected to the first PC. The network printer is accessible to the first user via the first PC and the Ethernet. The personal printer is only accessible to the first user via the first PC. A different PC user using a second PC that is connected to the Ethernet can also access the same network printer. However, from the second PC, the second user cannot access or print on the personal printer, which is directly connected to the first PC.

Limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in, for example, systems and methods of printer resource sharing in a communication network. A system in accordance with an embodiment of the present invention may comprise, for example, at least one communication device, a communication network, print server software, and at least one personal printer resource. The communication device may be deployed at a location. The communication network may be communicatively coupled to that communication device. The print server software may receive from the communication device via the communication network a request for printing of information content. The print server software may respond by coordinating the printing of the information content. The at least one personal printer resource may be communicatively coupled to the at least one communication device. The print server software may reside outside of the at least one personal printer resource, and the at least one personal printer resource may be accessed for printing by the communication device via the communication network.

In another embodiment, a system may comprise, for example, a first communication device, a second communication device, a communication network, information content, a print server software, and a personal printer resource. The first communication device may be deployed at a first location. The second communication device may be deployed at a second location. The communication network may be communicatively coupled to the first location and the second location. The information content may reside on the first communication device. The print server software may reside on the second communication device and may coordinate the printing of the information content. The personal printer resource may be communicatively coupled to the communication network, so that the first communication device may push the information content to the second communication device for printing on the personal printer resource.

In another embodiment, a method in accordance with the present invention may comprise, for example, one or more of the following: searching through a plurality of video frames on a communication network via a communication device, the communication device being communicatively coupled to the communication network; selecting a video frame of the plurality of video frames using the communication device; transcoding the selected video frame using the communication device to obtain a single image frame; and printing the single image frame from the communication device on at least one network printer resource, the at least one network printer resource being communicatively coupled to the communication device via the communication network.

In another embodiment, a method in accordance with the present invention may comprise, for example, one or more of the following: selecting or generating an image frame on a communication device, the communication device being communicatively coupled to the communication network; calling up printer resources available on the communication network using the communication device; selecting a printer resource from the available printer resources using the communication device; viewing printing parameters of the selected printer resource using the communication device; accepting the printer resource and the printing parameters using the communication device; and printing the image frame on the accepted printer resource.

These and other advantages, aspects and novel features of the present invention, as well as details of an illustrated embodiment thereof, will be more fully understood from the following description and drawings.

BRIEF DESCRIPTION OF THE DRAWINGS

FIG. 8 is an exemplary illustration of a TV guide channel user interface showing several options of a pushed media in accordance with an embodiment of the present invention.

FIG. 9B illustrates an alternative embodiment of a media processing system (MPS) in accordance with various aspects of the present invention.

DETAILED DESCRIPTION OF THE INVENTION

Figure 1A:
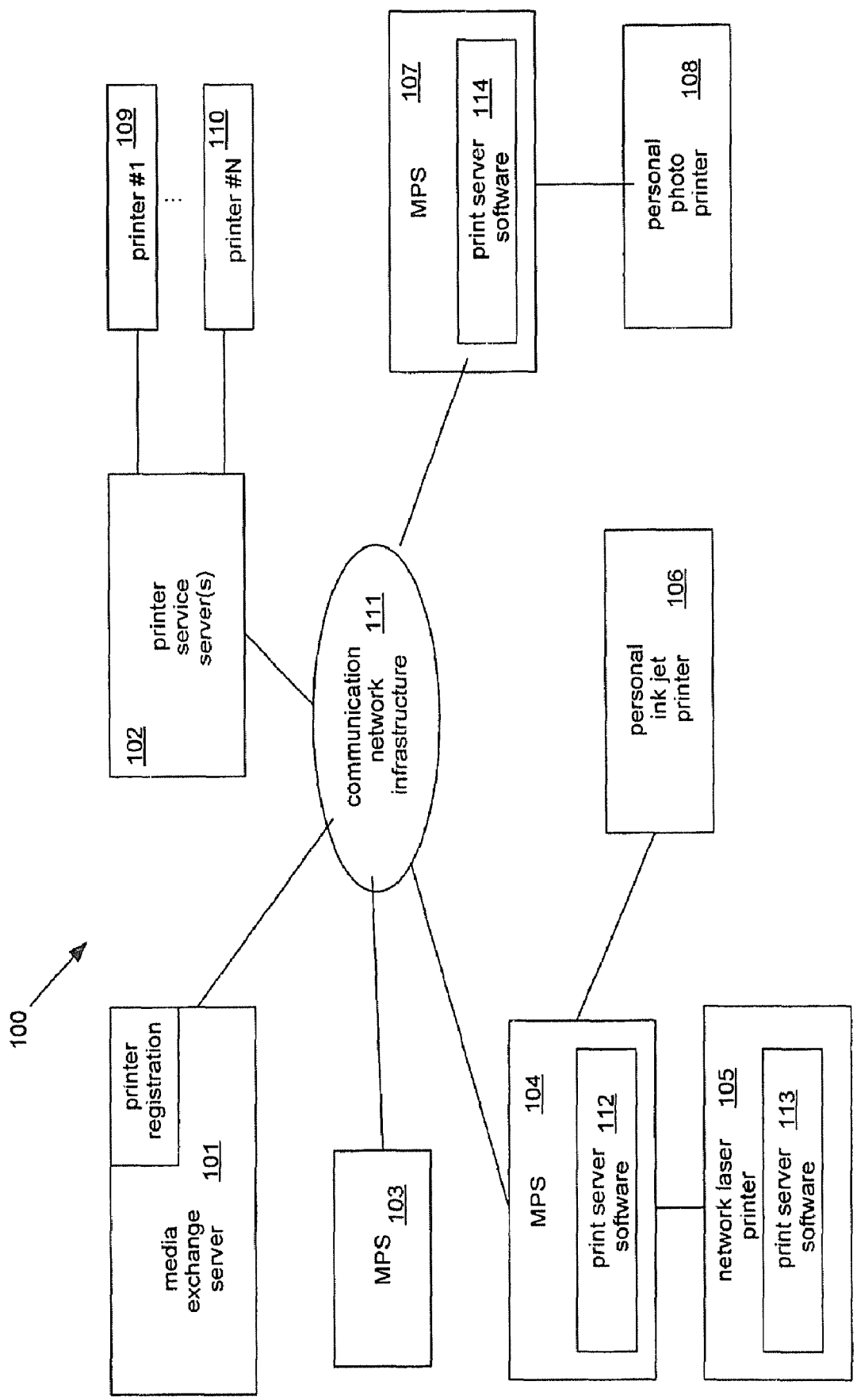
FIG. 1A is a diagram illustrating an embodiment of a media exchange network comprising an architecture to support the sharing of printer resources, in accordance with various aspects of the present invention.

FIG. 1A is a diagram illustrating an embodiment of a media exchange network 100 comprising an architecture to support the sharing of printer resources, in accordance with various aspects of the present invention. Specifically, the media exchange network 100 is a communication network comprising a media exchange server 101, a printer service server 102, a first MPS (media processing system) 103, a second MPS 104, a network laser printer 105, a personal ink jet printer 106, a third MPS 107, a personal photo printer 108, a printer #1 109 through a printer #N 110, and a communication network infrastructure 111. The media exchange server 101, the printer service server 102, the MPS 103, the MPS 104, and the MPS 107 each connect to the communication network infrastructure 111. In accordance with an embodiment of the present invention, the communication network infrastructure 111 may comprise the Internet, broadband access headends, cable infrastructure, DSL infrastructure, satellite infrastructure, and any combination thereof. A broadband access headend may comprise a cable headend, a satellite headend, or a DSL headend, in accordance with various embodiments of the present invention.

The printer #1 109 through the printer #N 110 interface to the printer service server 102. The personal ink jet printer 106 and the network laser printer 105 interface to the MPS 104. The personal photo printer 108 interfaces to the MPS 107. Any of the interfaces of the media exchange network 100 may be wired or wireless in any combination in accordance with various embodiments of the present invention. The MPS 104 includes a print server software component 112. The network laser printer 105 includes a print server software component 113. The MPS 107 includes a print server software component 114. In an embodiment of the present invention, the printers may be wireless.

The media exchange network 100 solves the problem of sharing printer resources on the media exchange network 100. In accordance with an embodiment of the present invention, the media exchange server 101 provides functionality on the media exchange network 100 including digital printer registration, media transcoding, billing and payment, device registration, channel/program setup and management, and security.

The various elements of the media exchange network 100 include storage locations for digital media and data. The storage locations may comprise, for example, hard disk drives, a DVD player, a CD player, floppy disk drives, RAM, or any combination of these. The storage locations may also include, for example, memory sticks, PCMCIA cards, compact flash cards, or any combination of these.

The MPS's (103, 104, and 107) are essentially enhanced set-top boxes, in one embodiment. The MPS's (103, 104, and 106) may each include a TV screen for viewing and interacting with various user interfaces, media, data, and services that are available on the media exchange network using, for example, a remote control The MPS's include functional software to support interaction with the various elements of the media exchange network 100, in accordance with various embodiments of the present invention.

Other embodiments of the present invention may comprise various combinations and/or multiple instantiations of the elements of FIG. 1A, in accordance with various aspects of the present invention, along with PC's (personal computers) and MP (media peripheral) devices.

The printer service server 102 performs the functions of user authorization, billing, and buffering of print jobs from various devices on the media exchange network 100. The printer service server 102 also delivers print jobs to any of the printers 109 through 110.

For example, the MPS 103 may desire to print an image of a digital picture taken with a digital camera but currently stored in the MPS 103. The user of the MPS 103 routes the image to the printer service server 102 via the communication network infrastructure 111 for printing. The printer service server 102 may then deliver the print job of the image to be printed to printer #1 109 where the image is printed.

In accordance with various embodiments of the present invention, an MPS may comprise a set-top box (STB), a PC, or a TV with a media management system (MMS). An MMS is known herein as a media exchange software (MES) platform.

An MMS comprises a software platform operating on at least one processor to provide certain functionality including user interface functionality, distributed storage functionality, and networking functionality. For example, an MMS may provide control of media peripheral devices, status monitoring of media peripheral devices, and inter-home MPS routing selection, in accordance with an embodiment of the present invention.

In accordance with an embodiment of the present invention, the print server software components 112, 113, and 114 each perform the functions of buffering up print jobs on the media exchange network 100 and delivering those jobs to printers connected to a corresponding MPS. In general, a print server software component may be located anywhere on a media exchange network including in, for example, an MPS, a PC, a TV, a NAS, a SAN, a media exchange server, a headend, etc.

For example, the user of the MPS 103 may push an image to be printed as a print job to the MPS 104 via the communication network infrastructure 111. The print server software component 112 in the MPS 104 may then buffer up and deliver the print job to the personal ink jet printer 106. The personal ink jet printer 106 does not include any print server functionality and, therefore, relies on the print server software component 112 to provide the print server functionality.

However, the MPS 104 may route the print job from the MPS 103 to the network laser printer 105. In such a scenario, the network laser printer 105 includes the print server software component 113 to perform the print server functions. As a result, the print server software component 112 is not used by the MPS 104 when routing print jobs to the network laser printer 105.

By definition herein, any network printer on the media exchange network 100 includes a print server software component to provide print server functionality. A network printer includes a network card, runs network server software, and supports multiple devices. IP addressed-based print jobs are sent to a network printer and a network printer sends IP confirmation back to the sources of the print jobs. A network printer may be connected directly to a media exchange network without having to go through an MPS or a PC.

However, any personal printer on the media exchange network 100 does not include a print server software component and relies on an MPS with a print server software component, or a printer service server to perform the printer server functions. A personal printer may connect to a PC or an MPS via a serial port or a parallel port. A PC or an MPS includes a network card and software to take print job requests from $3^{rd}$ parties and pump the print jobs to the personal printer. For example, the personal ink jet printer 106 relies on the print server software component 112 in the MPS 104, and the personal photo printer 108 relies on the print server software component 114 in the MPS 107. The network laser printer 105 includes its own print server software component 113.

Figure 1B:
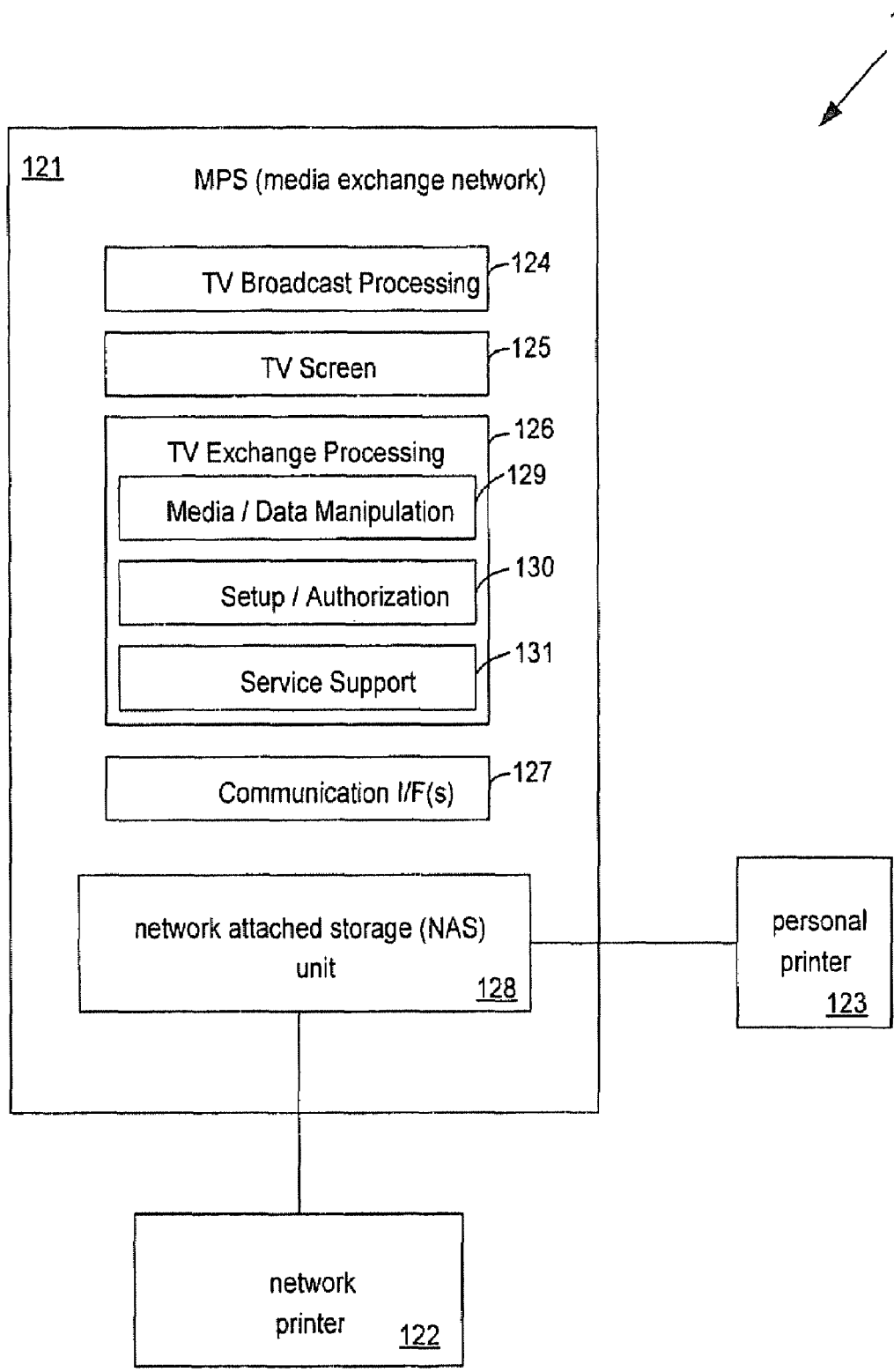
FIG. 1B is a diagram illustrating an embodiment of an MPS (media processing system) on the media exchange network of FIG. 1A interfacing to printer resources, in accordance with various aspects of the present invention.

FIG. 1B is a diagram illustrating an embodiment 120 of an MPS (media processing system) 121 on the media exchange network 100 of FIG. 1A interfacing to printer resources 122 and 123, in accordance with various aspects of the present invention. The MPS 121 comprises a TV screen 125, a TV broadcast processing platform 124, a TV exchange processing platform 126, communication interfaces 127, and a NAS (network attached storage) unit 128. The TV exchange processing platform 126 provides the functionality of media/data manipulation 129, setup/authorization 130, and service support 131.

The TV broadcast processing platform 124 includes circuitry for broadcast channel tuning, amplification, and decoding for media consumption and is not used for the functions of media/data manipulation, set up/authorization, and service support, except for that image generation circuitry which is used to drive the TV screen for display of a TV channel guide user interface, for example.

The communication interfaces 127 in the MPS 121 allow media/data communication between the MPS 121 and other devices on the media exchange network 100. The communication interfaces 127 may also allow communication with the TV screen 125, in accordance with an embodiment of the present invention.

The NAS unit 128 in the MPS 121 comprises a collection of mass storage devices contained in a single unit with a built-in operating system. An NAS unit is a dedicated computer that manages storage devices and is "tuned up" to store media. The NAS may serve many users on a media exchange network at the same time. The NAS buffers up storage, retrieval and print jobs and may include, for example, an Ethernet card for connectivity.

In accordance with an embodiment of the present invention, the NAS unit 128 includes a print server software component to provide print server functionality as previously described herein. The NAS unit 128 interfaces with the personal printer 123 and the network printer 122. The interfaces may be wired or wireless interfaces such as, for example, Ethernet or 802.11b. The NAS unit 128 may include a large hard disk as well as a set of SCSI connectors to attach additional disks, CD-ROM drives, tape drives, etc. The NAS unit 128 is managed by its own embedded operating system.

Figure 1C:
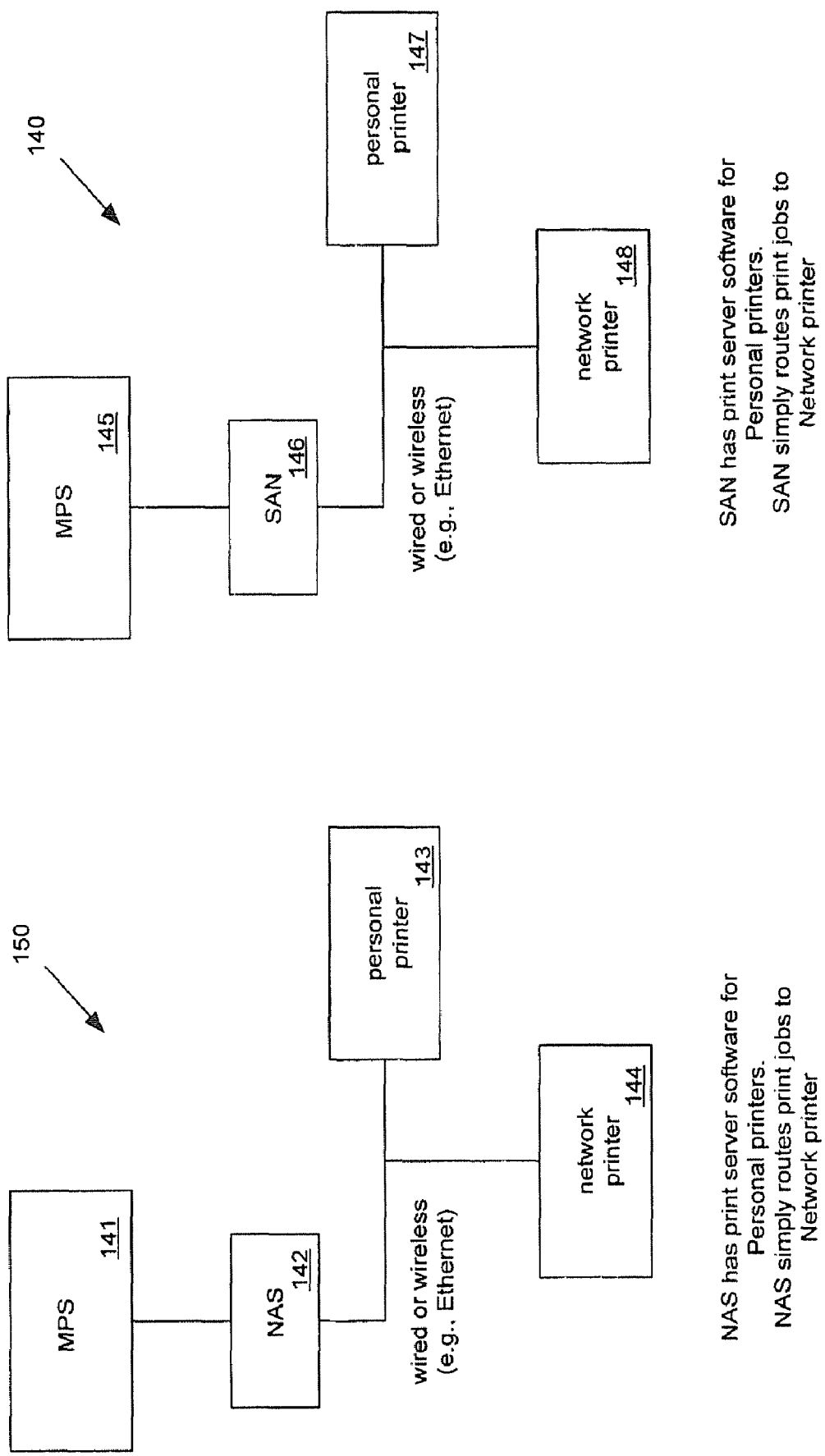
FIG. 1C is a diagram illustrating embodiments of an NAS (network attached storage) unit and an SAN (storage area network) interfacing between MPS's and printer resources on the media exchange network of FIG. 1A, in accordance with various aspects of the present invention.

FIG. 1C is a diagram illustrating embodiments 140 and 150 of a NAS (network attached storage) unit 142 and a SAN (storage area network) 146 interfacing between MPS's and printer resources on the media exchange network of FIG. 1A, in accordance with various aspects of the present invention. A SAN comprises a network that allows storage functions to be physically separated from data-processing functions on a network. This helps reduce network traffic by isolating large data transfers. The embodiment 150 comprises an MPS 141 interfacing to the NAS 142, and a network printer 144 and a personal printer 143 also interfacing to the NAS 142. The embodiment 140 comprises an MPS 145 interfacing to the SAN 146, and a network printer 148 and a personal printer 147 also interfacing to the SAN 146. In such embodiments, the NAS 142 and the SAN 146 are outside of the MPS's 141 and 145. The interface between the NAS 142 and the printers 143 and 144 may be wired or wireless, in accordance with various embodiments of the present invention. Similarly, the interface between the SAN 146 and the printers 147 and 148 may be wired or wireless, in accordance with various embodiments of the present invention. For example, the interfaces may comprise Ethernet interfaces.

To support personal printers, the NAS 142 and the SAN 146 include print server software components. For network printers, the NAS 142 and SAN 146 simply route print jobs to the network printers.

Figure 2A:
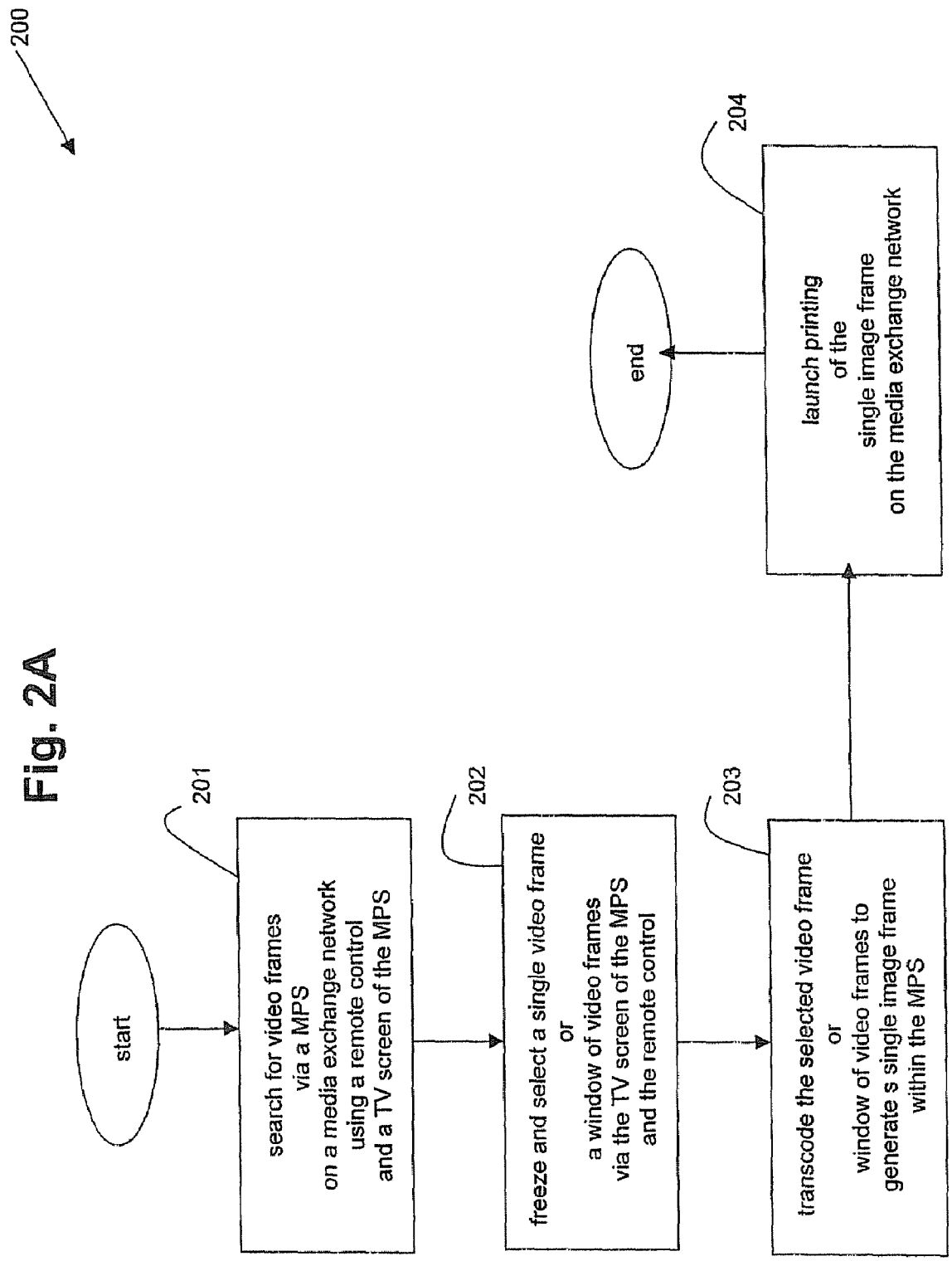
FIG. 2A is a flowchart illustrating an embodiment of a method to select and launch a frame for printing on the media exchange network of FIG. 1A, in accordance with various aspects of the present invention.

FIG. 2A is a flowchart illustrating an embodiment of a method 200 to select and launch a frame for printing on the media exchange network 100 of FIG. 1A, in accordance with various aspects of the present invention. In step 201, video frames are searched for on an MPS on a media exchange network using a remote control while viewing the video frames on a TV screen of the MPS. In step 202, a single video frame or a window of video frames is frozen and selected on the TV screen of the MPS using the remote control. In step 203, the selected video frame or window of video frames is transcoded within the MPS to generate a single image frame. In step 204, printing of the single image frame is launched on the media exchange network.

For example, referring to FIG. 1A, a user of the MPS 103 may search for and find a window of video frames within a movie. The user may freeze and select the window of video frames. The user may then command the MPS 103 to transcode the window of video frames from an MPEG format to a JPEG image format to generate a single JPEG image frame. The user of the MPS 103 may then launch the single JPEG image frame onto the media exchange network 100 for printing on, for example, the network laser printer 105 at the location of the user of the MPS 104.

Some examples of video formats include the MPEG family of video formats, the Windows media formats, the Real-Player format, the Quick-Time video format, the H.263 video format, the H.323 video format, and other new video formats. Some examples of image formats include JPEG, TIFF, bit map, GIF, and PCX, and any other new image formats.

Figure 2B:
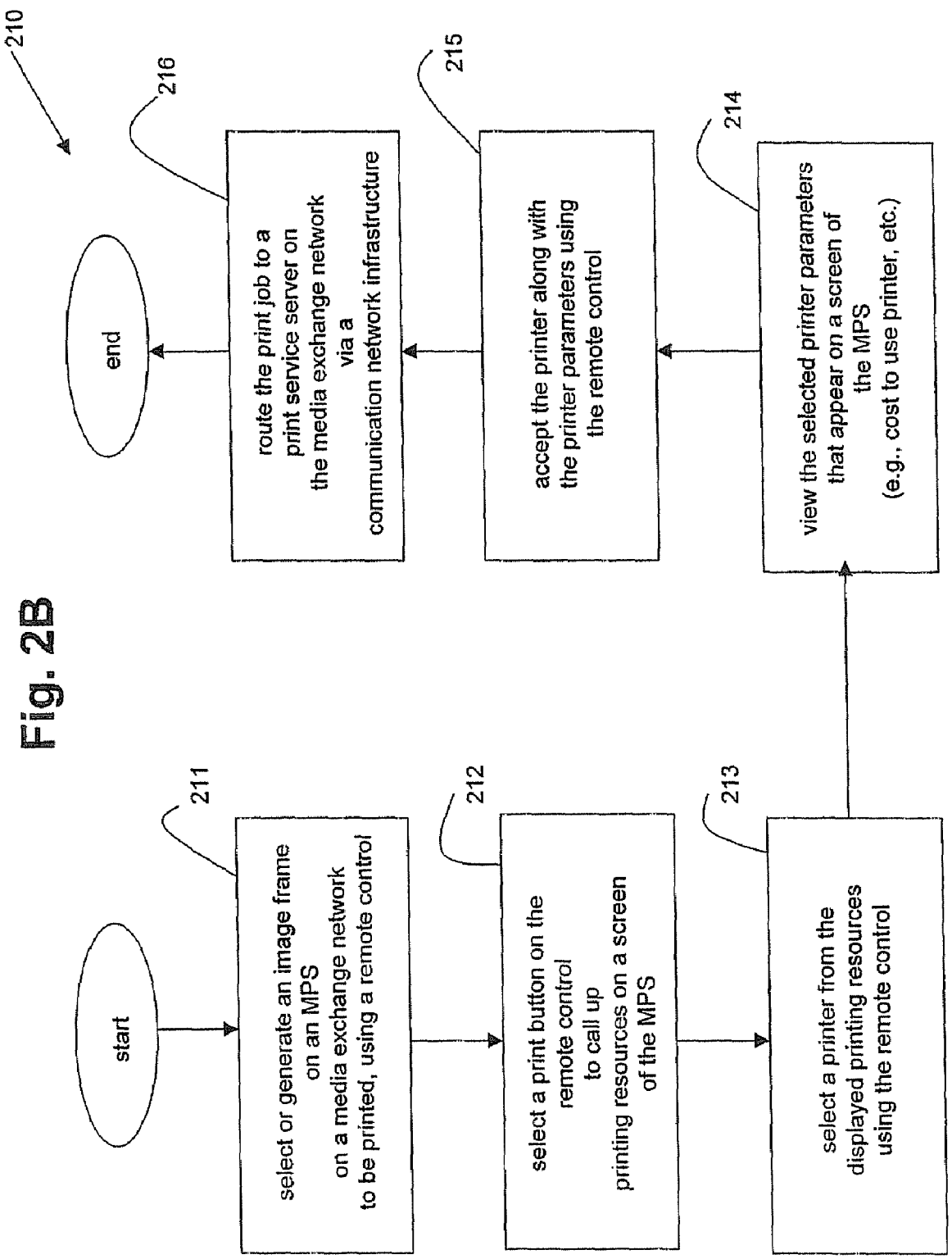
FIG. 2B is a flowchart illustrating an embodiment of a method to select a printing resource and route a print job on the media exchange network of FIG. 1A, in accordance with various aspects of the present invention.

FIG. 2B is a flowchart illustrating an embodiment of a method 210 to select a printing resource and route a print job on the media exchange network 100 of FIG. 1A, in accordance with various aspects of the present invention. In step 211, an image frame is selected or generated on an MPS of a media exchange network to be printed, using a remote control. In step 212, a print button is selected on the remote control to call up a list of printing resources on a TV screen of the MPS. In step 213, a printer is selected from the displayed printing resources using the remote control. In step 214, parameters of the selected printer are displayed and viewed on the TV screen of the MPS. In step 215, the selected printer, along with its parameters, are accepted on the MPS using the remote control. In step 216, the MPS routes the print job to a print service server on the media exchange network via a communication network infrastructure.

As an example, referring to FIG. 1A, a user of the MPS 103 may select an image stored on the MPS 107 using a remote control. The user may then select a print button on the remote control to call up the various printing resources on a TV screen of the MPS 103. The list of printing resources displayed includes the network laser printer 105, the personal ink jet printer 106, the personal photo printer 108, and the printer #1 109 through the printer #N 110, and any other printing resources that may be registered on the media exchange server 111. The user then selects printer #N 110 from the list using the remote control. A set of parameters come up on the TV screen of the MPS 103 corresponding to the printer #N 110. The parameters include, for example, the cost of using the printer, and may queue the user to select a print size and type of color. The user finalizes the parameter selections and accepts the printer and parameters using the remote control. Once accepted, the MPS 103 then routes the print job of the image to the printer service server 102 via the communication network infrastructure 111. The printer service server 102 buffers up the print job and eventually delivers the print job to the printer #n 110 for printing.

As another example, a user of the MPS 103 may go through the same process as before but now, selects the personal ink jet printer 106 at his brother's house who is the user of the MPS 104, for example. In such a scenario, once the print job arrives at the MPS 104, the user of the MPS 104 (i.e., the brother) manually accepts the print job using his remote control associated with the MPS 104. Once accepted, the print server software component 112 buffers up and delivers the print job to the personal ink jet printer 106 for printing. In accordance with an alternative embodiment of the present invention, the user of the MPS 104 does not have to accept the print job. The print job may, instead, be automatically routed to the personal ink jet printer 106 by the MPS 104 using the print server software component 112.

As a further example, the user of the MPS 107 may wish to print an image stored in the MPS 107. The user goes through the process of selecting the image and selecting the personal photo printer 108. The personal photo printer 108 is owned by the user of the MPS 107 and is at the same location as the MPS 107. Therefore, a second step of acceptance, as in the previous example by the user of the MPS 104, is not performed in this case. The print job is delivered by the print server software component 114 to the personal photo printer 108 once the user of the MPS accepts the personal photo printer 108 as in steps 215 and 216 of the method 210.

As a final example, a mother may have a personal printer connected to an MPS at her house. The MPS does not include any print server functionality. A son desires to send a print job to the mother via his MPS. The son's MPS sends the print job to the mother's MPS via some route on the media exchange network. However, the print server functionality is handled somewhere outside of the mother's house. For example, the son's MPS may handle the print server functionality or a printer service server may handle the print server functionality. Once the print job reaches the mother's MPS, the mother may accept the print job and the MPS simply sends the print job to the mother's personal printer.

In accordance with an embodiment of the present invention, the MPS's of the media exchange network 100 may or may not include a NAS or a SAN as shown in FIG. 1B. Also, in accordance with another embodiment of the present invention, the media exchange network 100 may include standalone NAS's and/or SAN's, as shown in FIG. 1C, in accordance with various aspects of the present invention. A NAS or a SAN may connect anywhere on the media exchange network including to a headend, an MPS, a PC, etc.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a TV channel guide look-and-feel user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top boxes or integrated MPS's (media processing systems) may be used with the media exchange network to perform all of the previously described media exchange functions using a remote control with a television screen.

Current set-top boxes may be software enhanced to create an MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS, or enhanced PC, is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
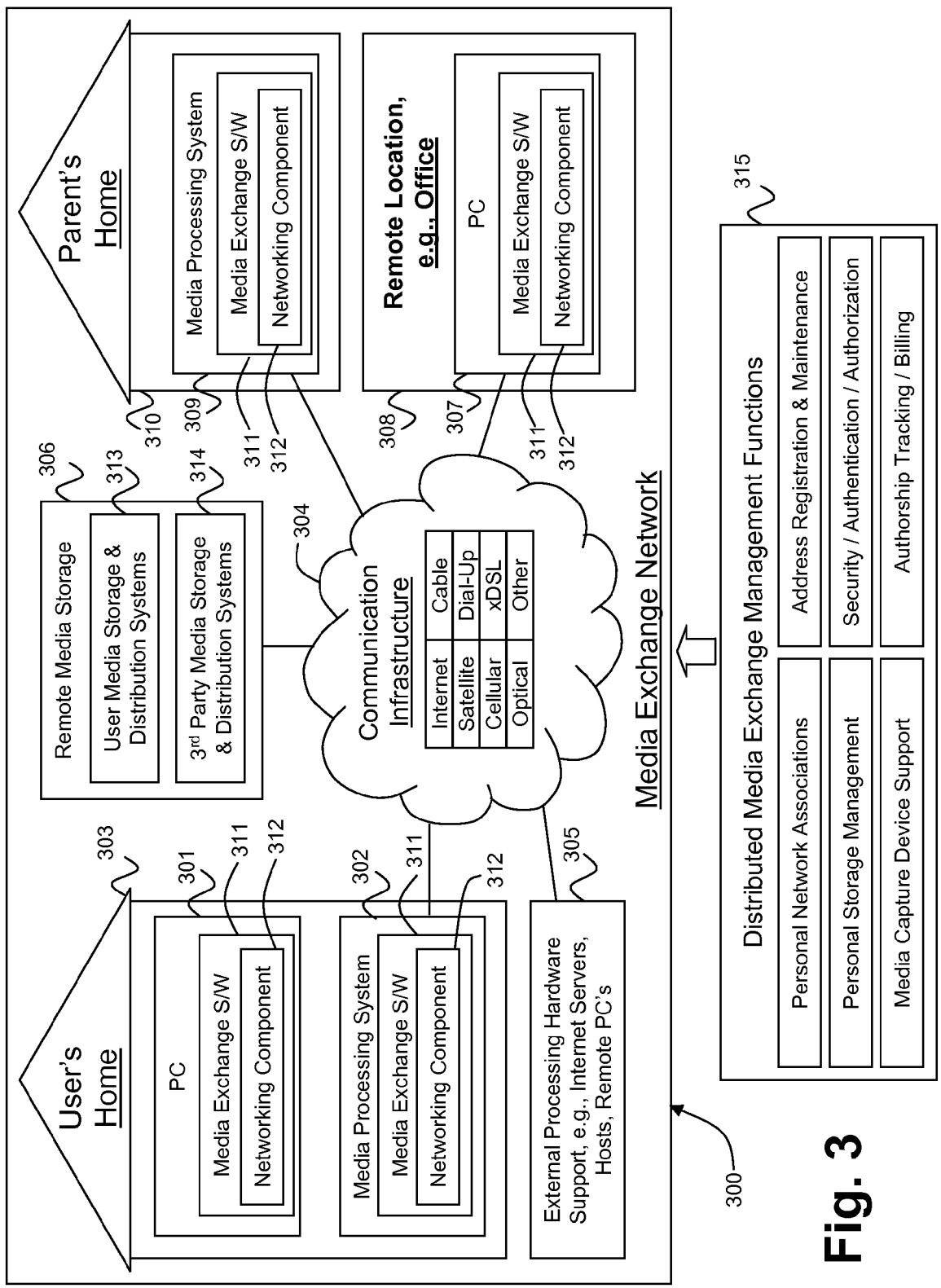
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated TV channel guide look-and-feel.

The external processing hardware support 305 comprises at least one server such as a centralized Internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of Internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
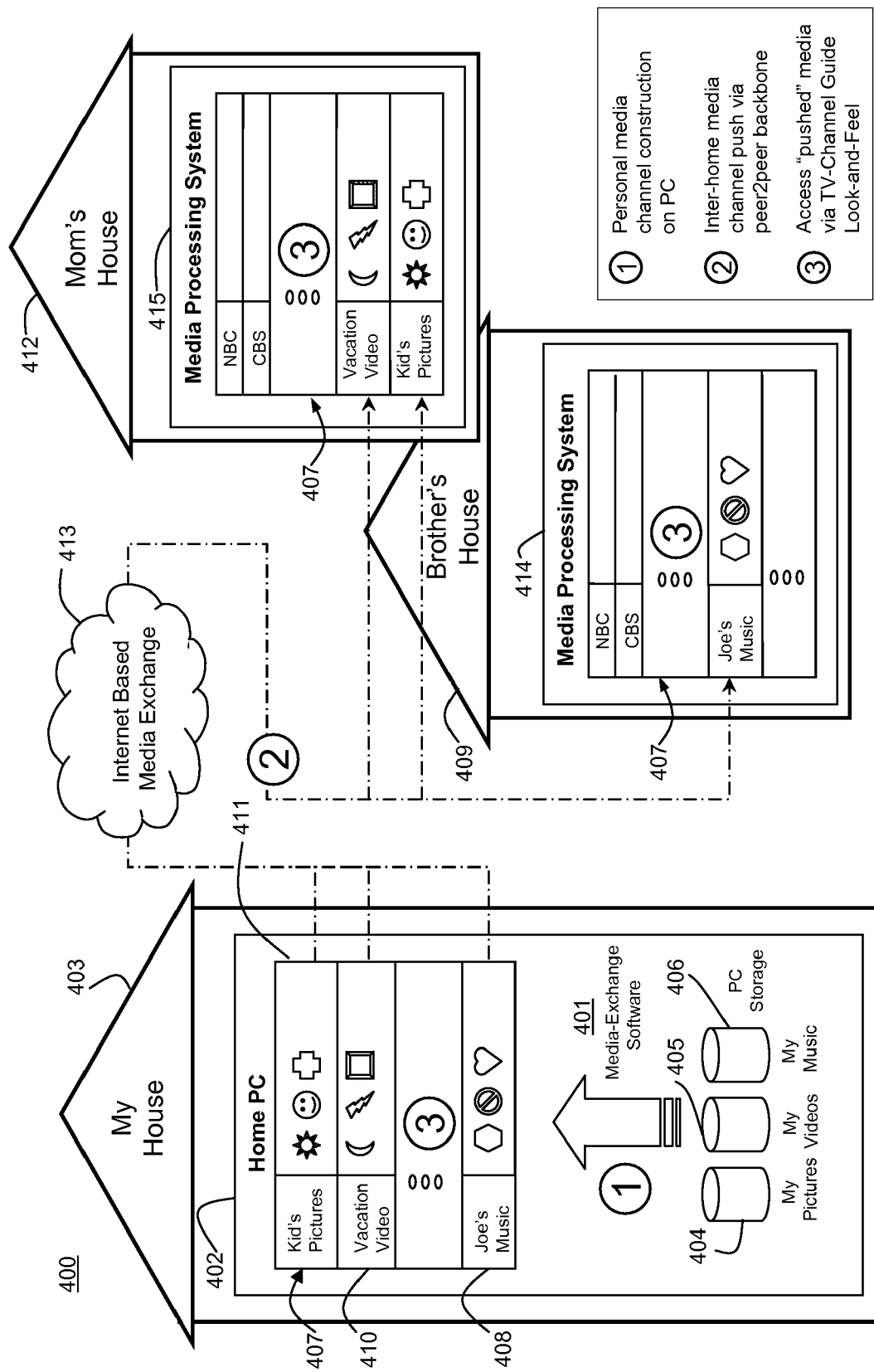
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a TV channel guide look-and-feel user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the Internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a TV channel guide look-and-feel user interface 407.

In step 3, brother and/or Mom access the pushed media channels via their respective media processing systems (MPS's) 414 and 415 using their respective MPS TV screens and remote controls.

Figure 5:
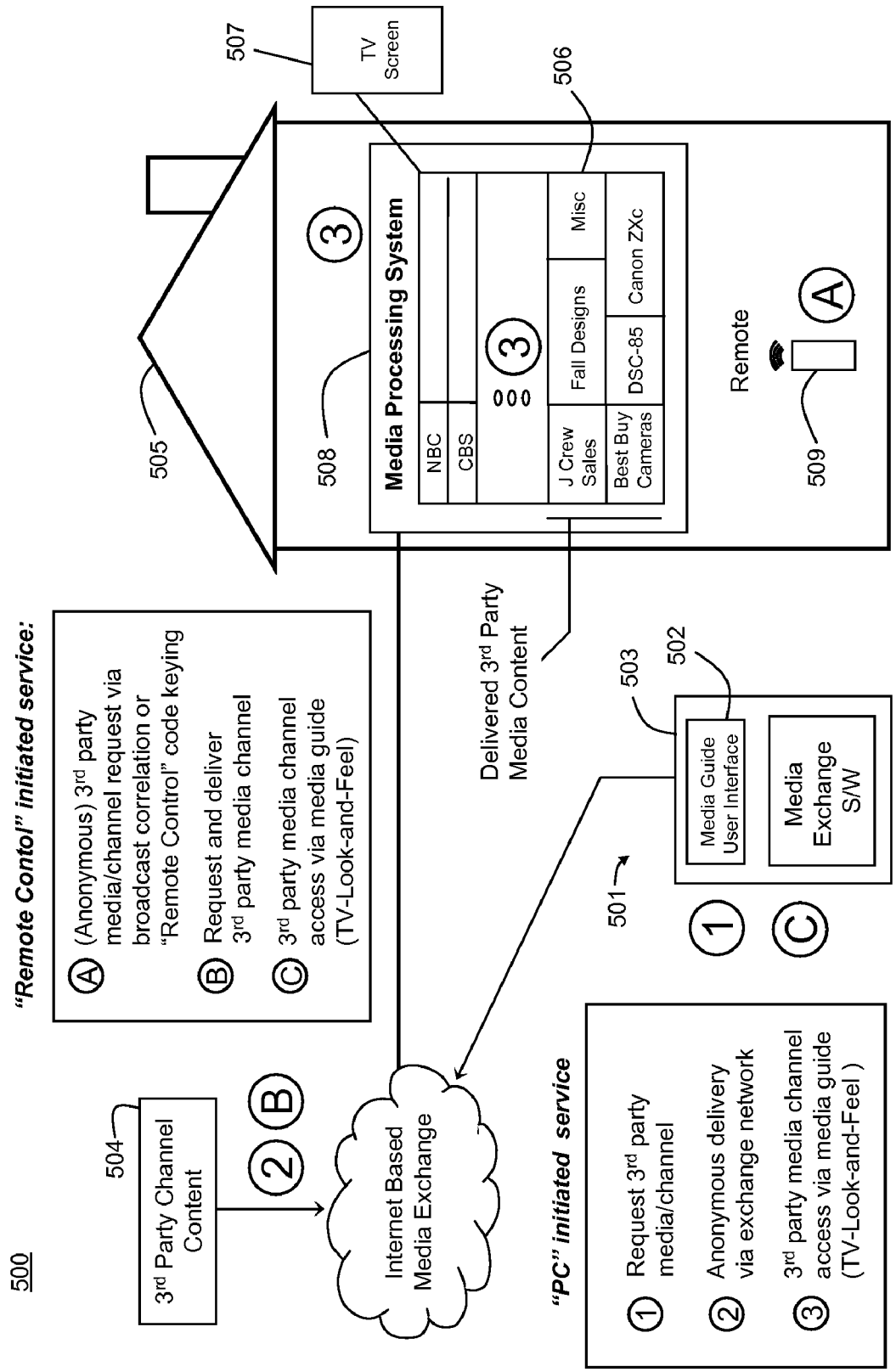
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an Internet-based media exchange network 500 using a TV channel guide look-and-feel user interface 502 on a PC 503. In step 2, an anonymous delivery of the requested third-party channel 504 is made to a second party 505 via the Internet-based media exchange network 500. In step 3, the second party 505 accesses the third-party channel 504 using a TV channel guide look-and-feel user interface 506 on a TV screen 507 that is integrated into an MPS 508.

Similarly, in step A, an MPS-initiated third-party request is made by a second party 505 via an Internet-based media exchange network 500 using a TV channel guide look-and-feel user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the Internet-based media exchange network 500. In step C, the first party 501 accesses the third-party channel 504 using a TV channel guide look-and-feel user interface 502 on a PC 503.

Figure 6:
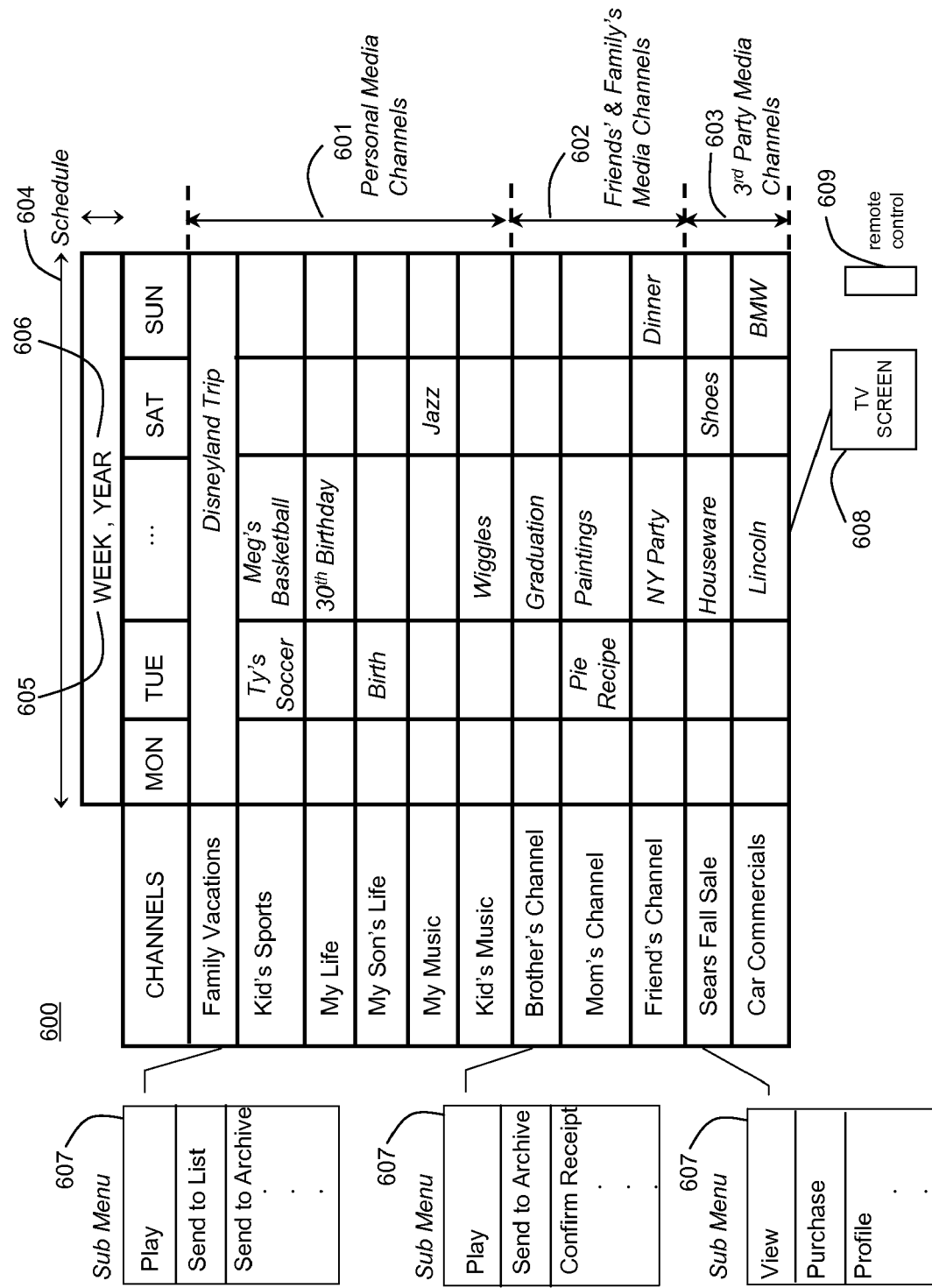
FIG. 6 is an exemplary illustration of a TV guide channel user interface in accordance with an embodiment of the present invention.

FIG. 6 illustrates a TV channel guide user interface 600 in accordance with an embodiment of the present invention. The TV channel guide user interface 600 may be displayed on a TV screen 608 and controlled by a remote control device 609.

Also, the TV channel guide user interface 600 may be displayed on a PC monitor and controlled by a keyboard or mouse.

The TV channel guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
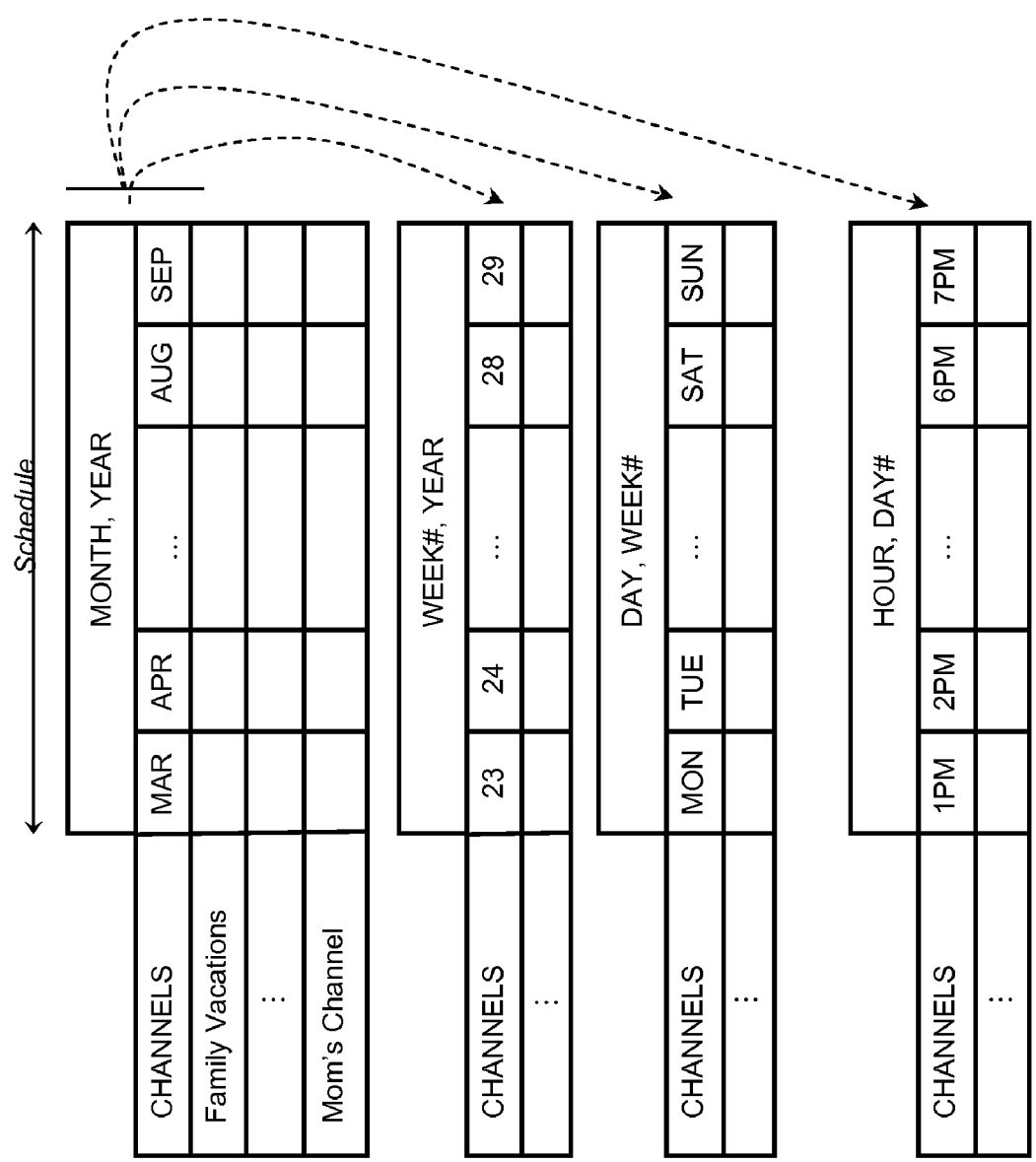
FIG. 7 is an exemplary illustration of several instantiations of a TV guide channel user interface of FIG. 4 in accordance with an embodiment of the present invention.

FIG. 7 illustrates possible multiple instantiations of a TV channel guide user interface 700 in accordance with an embodiment of the present invention. The TV channel guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The TV channel guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
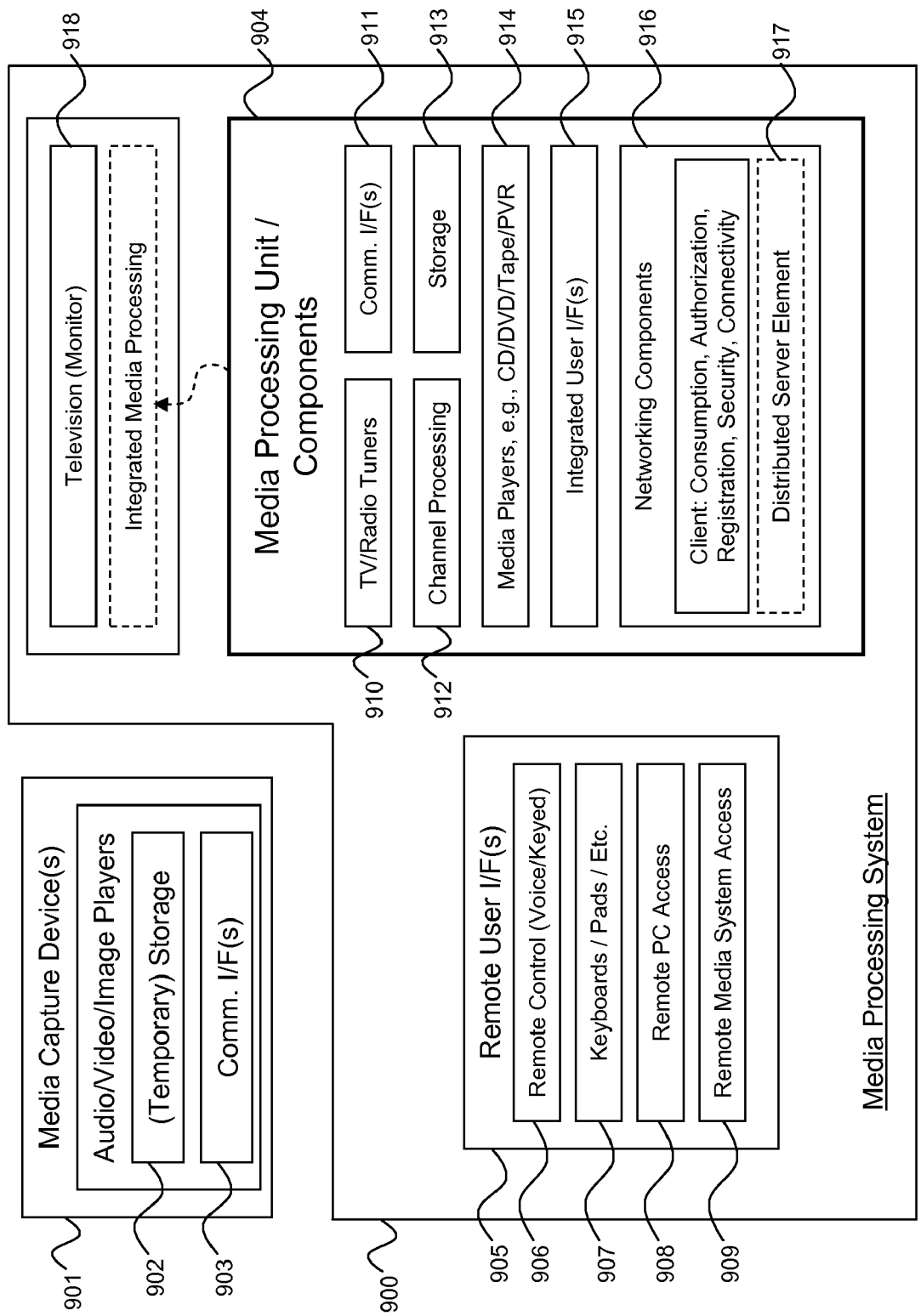
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server FIG. 9B illustrates an alternative embodiment of a media processing system (MPS) 920 in accordance with various aspects of the present invention. The MPS 920 is essentially an enhanced set-top box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and an MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
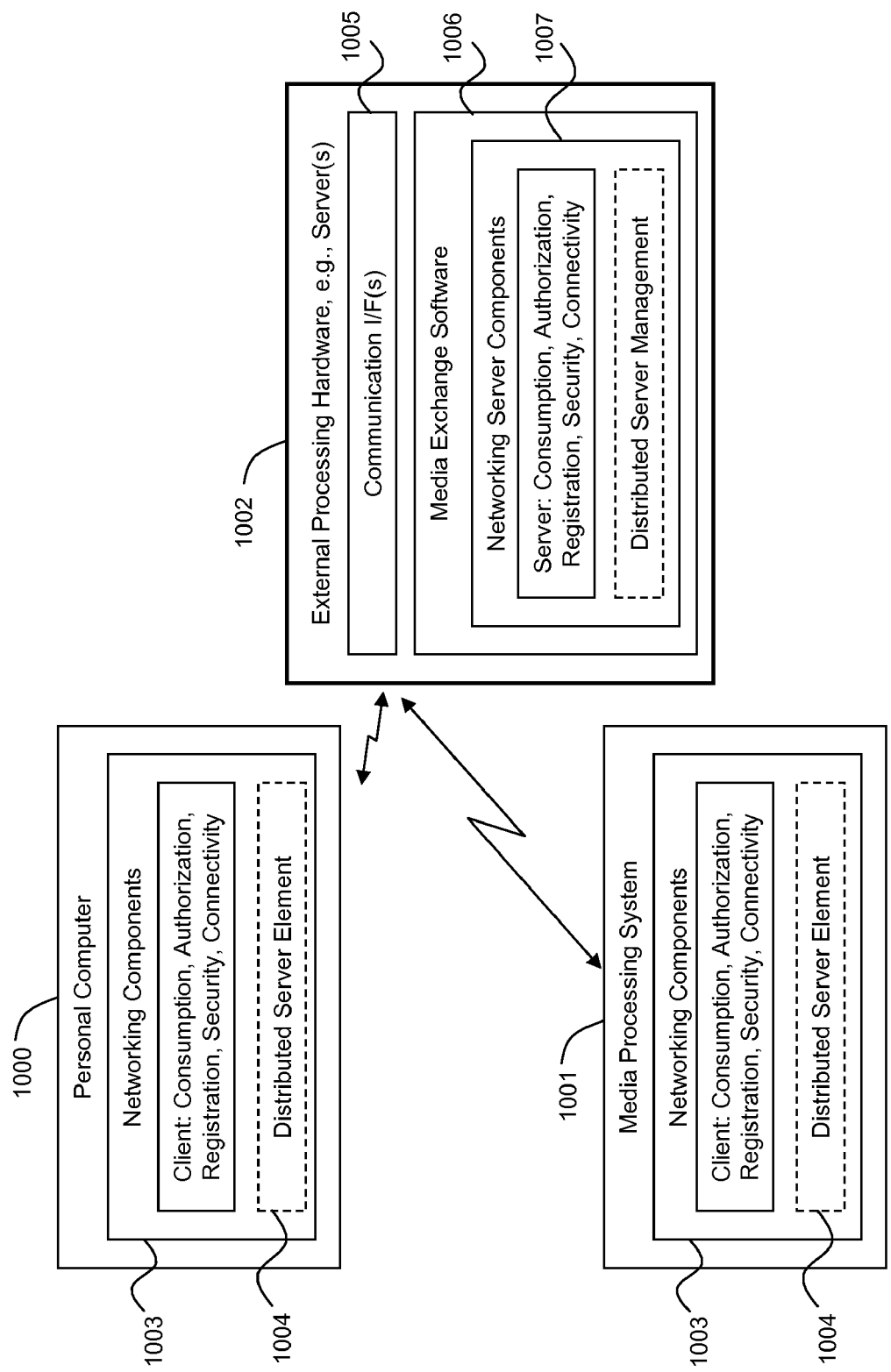
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
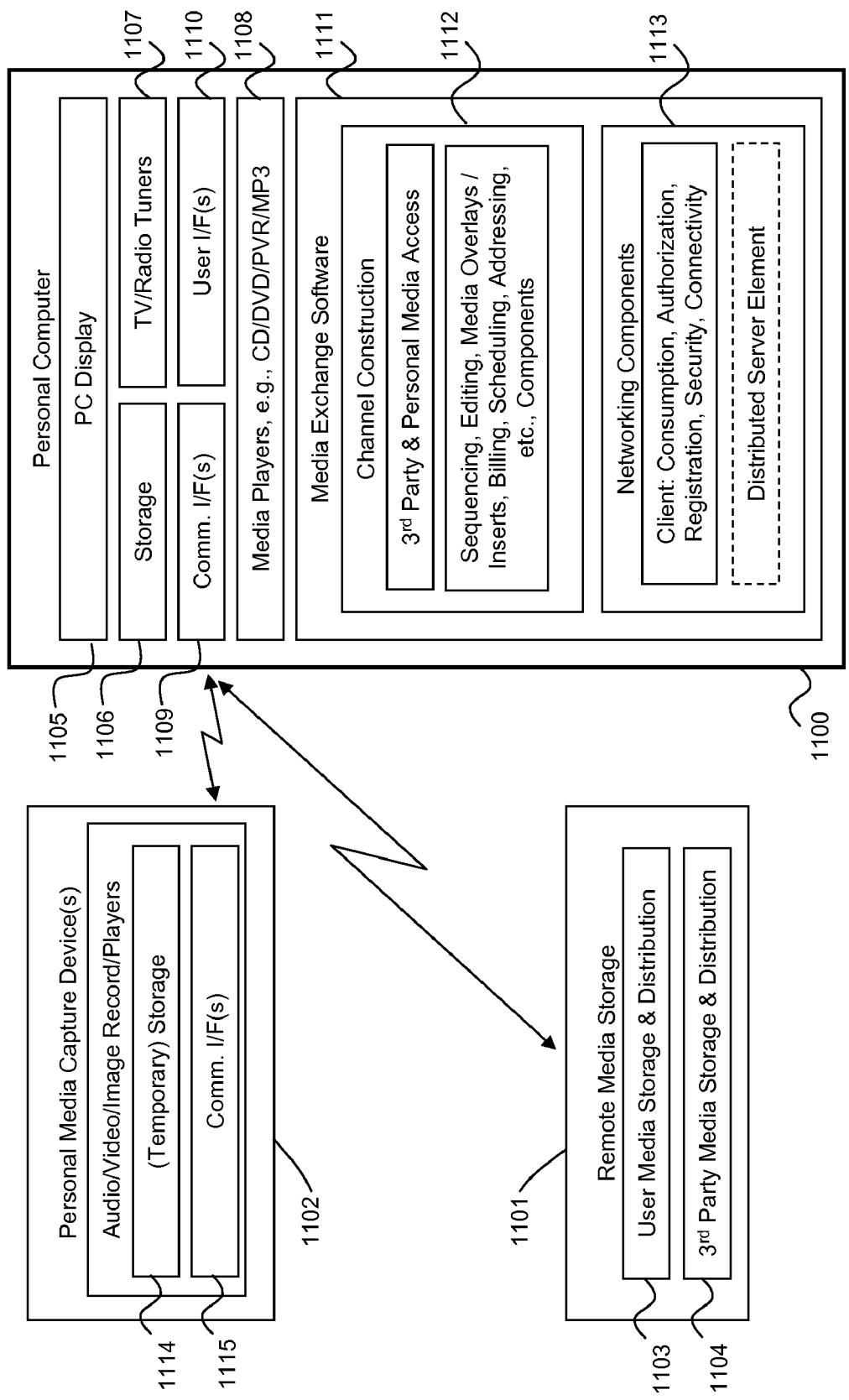
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

In summary, some embodiments according to the present invention may provide systems and methods that support printer resource sharing in a communication network.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A system providing printer resource sharing in a communication network, comprising:
   a first communication device deployed in a first residential location;
   a second communication device deployed in a second residential location;
   a communication network communicatively coupled to the first communication device and the second communication device; and
   at least one personal printer resource, communicatively coupled to the first communication device and the second communication devices,
   wherein the first communication device deployed in the first residential location enables printing of information content on the at least one personal printer resource, at a request of a user of the second communication device, and
   wherein the user of the first communication device receives a signal from the second communication device that authenticates the second communication device, prior to printing of the information content on the at least one personal printer resource at the request of the user of the second communication device.

2. The system according to claim 1, wherein the communication network comprises one or more of a broadband access headend, a cable infrastructure, a satellite network infrastructure, a digital subscriber line (DSL) infrastructure, an Internet infrastructure, an intranet infrastructure, a wired infrastructure, a closed communication infrastructure, a local area network, and/or a wireless infrastructure.

3. The system according to claim 1, wherein the user of the second communication device receives a signal from the first communication device that authenticates the first communication device, prior to printing of the information content on the at least one personal printer resource at the request of a user of the first communication device.

4. The system according to claim 1, wherein the information content comprises one or more of third party media content, digital video, digital images, digital audio, documents, files, broadcast television programs, radio channels, previously presented programming, sporting events programming, special programming, and/or on-demand movies.

5. The system according to claim 1, wherein the information content format comprises one or more of an MPEG video format, a Windows media format, a Real-Player format, a Quick-Time video format, an H.263 video format, an H.323 video format, a JPEG image format, a TIFF image format, a bit map image format, a GIF image format, and/or a PCX image format.

6. The system according to claim 1, comprising:
   a media exchange server communicatively coupled to the communication network,
   wherein the media exchange server provides functionality related to one or more of printer resource registration, media transcoding, billing for information content-related services, payment for information-content related services, information content management, communication device registration, and/or information content security.

7. The system according to claim 1, comprising:
   a printer service server communicatively coupled to the communication network; and
   at least one network printer resource communicatively coupled to the communication network via the printer service server and via the print server software, the print server software residing on the at least one network printer resource.

8. The system according to claim 7, wherein the printer service server provides functionality related to one or more of communication device authorization, billing for information content-related services, buffering of print jobs received from the communication network, and/or delivering print jobs to the at least one network printer resource.

9. The system according to claim 1, comprising:
   at least one storage device communicatively coupled to the communication network.

10. The system according to claim 9, wherein the storage device comprises one or more of a hard disk drive, a DVD player, a CD player, a floppy disk drive, a RAM, a memory stick, a PCMCIA card, and/or a compact flash card.

11. The system according to claim 1, comprising print server software that receives from one or both of the first communication device and/or the second communication device via the communication network a request for printing of information content and that responds by coordinating the printing of the information content.

12. The system according to claim 1, wherein the second communication device deployed in the second residential location enables printing of the information content on the at least one personal printer resource, at a request of a user of the first communication device.

13. A system providing printer resource sharing in a communication network, comprising:
 a first communication device deployed in a first residential location,
 wherein the first communication device deployed in the first residential location enables printing of information content on at least one personal printer resource, at a request of a user of a second communication device deployed in a second residential location, wherein the first communication device, the second communication device, and the at least one personal printer resource are communicatively coupled via a communication network, and wherein the first communication device receives a signal from the second communication device that authenticates the second communication device, prior to printing of the information content on the at least one personal printer resource at the request of the user of the second communication device.

14. The system according to claim 13, wherein the communication network comprises one or more of a broadband access headend, a cable infrastructure, a satellite network infrastructure, a digital subscriber line (DSL) infrastructure, an Internet infrastructure, an intranet infrastructure, a wired infrastructure, a closed communication infrastructure, a local area network, and/or a wireless infrastructure.

15. The system according to claim 13, wherein the second communication device receives a signal from the first communication device that authenticates the first communication device, prior to printing of the information content on the at least one personal printer resource at the request of a user of the first communication device.

16. The system according to claim 13, wherein the information content comprises one or more of third party media content, digital video, digital images, digital audio, documents, files, broadcast television programs, radio channels, previously presented programming, sporting events programming, special programming, and/or on-demand movies.

17. The system according to claim 13, wherein the information content format comprises one or more of an MPEG video format, a Windows media format, a Real-Player format, a Quick-Time video format, an H.263 video format, an H.323 video format, a JPEG image format, a TIFF image format, a bit map image format, a GIF image format, and/or a PCX image format.

18. The system according to claim 13, wherein the first communication device enables communication with a media exchange server communicatively coupled to the communication network, and wherein the media exchange server provides functionality related to one or more of printer resource registration, media transcoding, billing for information content-related services, payment for information-content related services, information content management, communication device registration, and/or information content security.

19. The system according to claim 13, wherein the first communication device enables communication with a printer service server communicatively coupled to the communication network, wherein at least one network printer resource is communicatively coupled to the communication network via the printer service server and via the print server software, and wherein the print server software resides on the at least one network printer resource.

20. The system according to claim 19, wherein the printer service server provides functionality related to at least one of the following: communication device authorization, billing for information content-related services, buffering of print jobs received from the communication network, and delivering print jobs to the at least one network printer resource.

21. The system according to claim 13, wherein the first communication device enables communication with at least one storage device communicatively coupled to the communication network.

22. The system according to claim 21, wherein the at least one storage device comprises at least one of the following: a hard disk drive, a DVD player, a CD player, a floppy disk drive, a RAM, a memory stick, a PCMCIA card, and a compact flash card.

* * * * *

UNITED STATES PATENT AND TRADEMARK OFFICE
CERTIFICATE OF CORRECTION

PATENT NO. : 7,586,636 B2 Page 1 of 1
APPLICATION NO. : 11/428700
DATED : September 8, 2009
INVENTOR(S) : Karaoguz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 160 days.

Signed and Sealed this

Twenty-first Day of September, 2010

David J. Kappos
*Director of the United States Patent and Trademark Office*